May 30, 1933.  T. M. PUTNAM  1,912,040
COASTER WAGON
Filed April 29, 1929   2 Sheets-Sheet 1
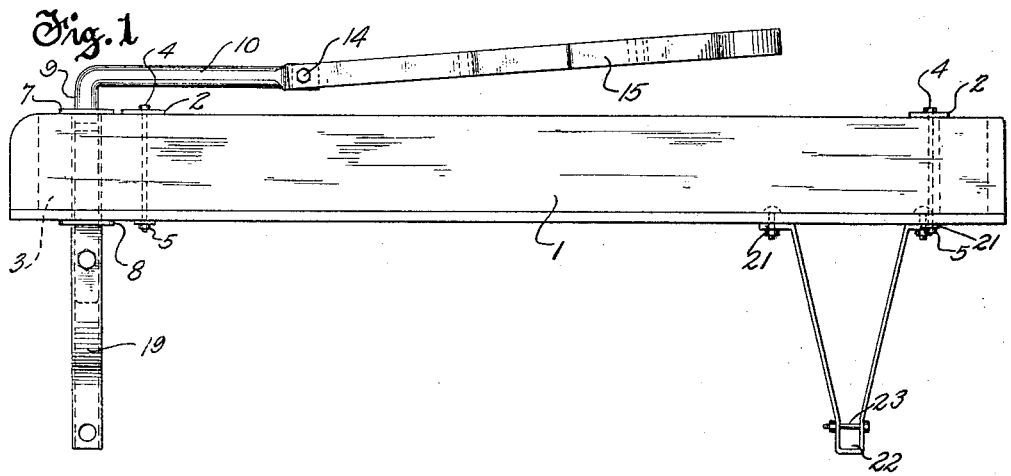
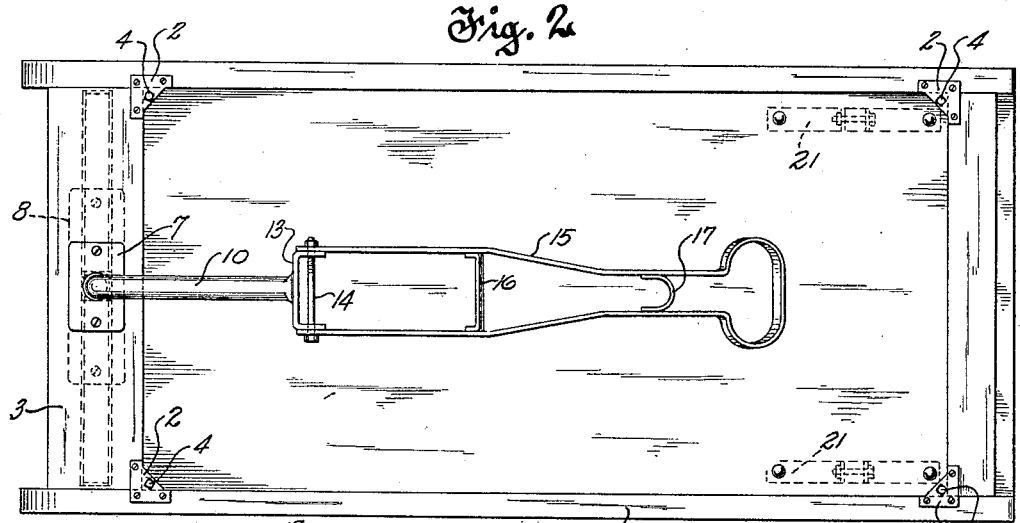
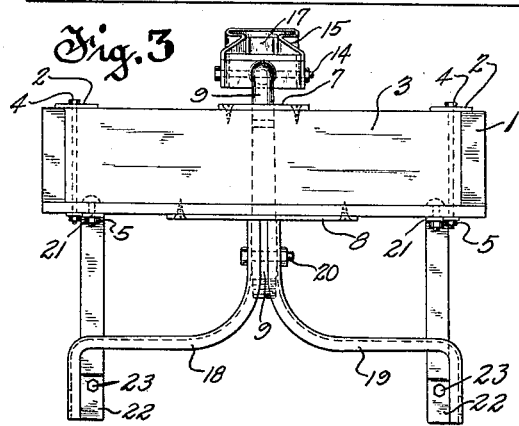
INVENTOR.
Thomas M. Putnam.
BY Battunn, Hudnall, Lecher
McNamara & Michael
ATTORNEY.

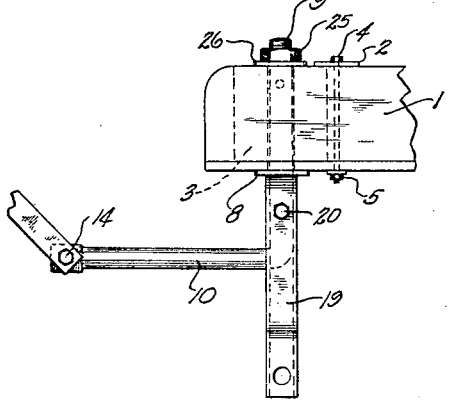
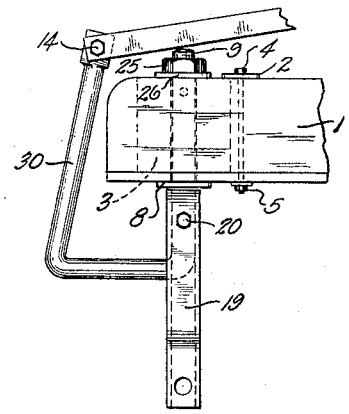
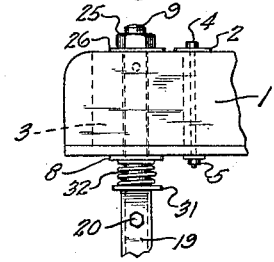
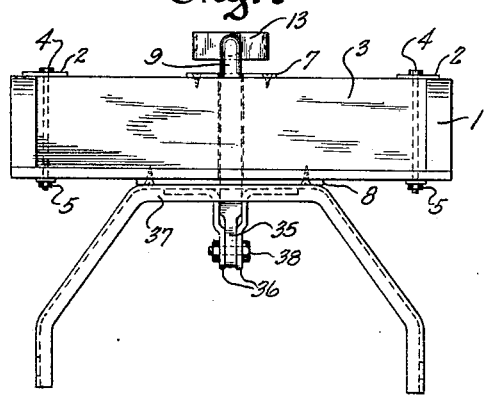
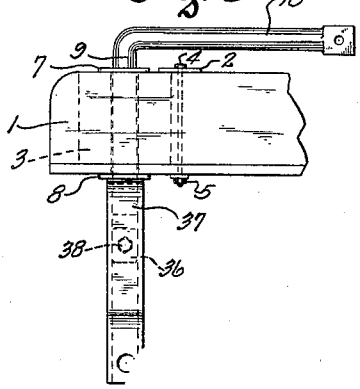

Patented May 30, 1933

1,912,040

UNITED STATES PATENT OFFICE

THOMAS M. PUTNAM, OF CEDAR GROVE, WISCONSIN

COASTER WAGON

Application filed April 29, 1929. Serial No. 358,809.

This invention relates to children's wagons and more particularly to coaster wagons having a tongue adapted to either extend forwardly of the wagon so that the latter may be drawn from the front or extend backwardly so that an occupant may steer the wagon.

The main objects of the invention are to improve and simplify wagons of this nature so as to make them stronger and more endurable while reducing the cost of manufacture thereof.

A further object is to improve the front end of the wagon so as to permit the front axle to rotate 360° to thereby allow the tongue to be conveniently positioned for various uses to which the wagon may be put.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a side view in elevation of one embodiment of a wagon body construction having the novel features of the present invention incorporated therein;

Figure 2 is a plan view of the wagon body of Figure 1;

Figure 3 is a front end view of the same;

Figure 4 is a fragmentary side view of the front end of the wagon body of Figure 1, the parts of the steering mechanism being assembled differently to change the position of the tongue;

Figure 5 is a fragmentary side view of the front end of a wagon body having a modified form of steering mechanism;

Figure 6 is a fragmentary view of a front end construction similar to those of Figures 1 to 5, showing how a spring may be incorporated therein;

Figure 7 is a front view in elevation; and

Figure 8 is a fragmentary view of a further modification of the invention.

Referring to Figures 1 to 3 of the drawings, the reference numeral 1 designates the wooden box of a coaster wagon of the type referred to. This box is similar to well known constructions of this type except for the angle iron brace plates 2 at the corners and the large wooden block 3 at the front end. The brace plates secure the parts of the box rigidly together, being secured to the side and end pieces by screws and forming abutments for bolts 4 secured to the bottom of the box by nuts 5.

The front end piece 3 and the bottom of the box are bored to receive and provide a journal box for the king pin. Metal plates 7 and 8 are secured to the top of end piece 3 and on the lower surface of the bottom of the box, respectively as shown, in order to reinforce these parts of the box, the plate 8 also serving as a bearing surface, as will appear hereinafter.

The king pin is of unique construction, being angled to provide a vertically disposed cylindrical portion 9 and a horizontally disposed portion 10. The portion 9 is threaded at its lower ends and provided with two transversely extending holes spaced slightly from its ends. The horizontal portion is provided with a yoke 13 at its end for supporting a bolt 14 which pivotally connects the wagon tongue to the king pin.

The wagon tongue is made up of three parts, the main one of which is a somewhat U-shaped member 15 which forms the main body of the handle. Two cross braces 16 and 17 form the other parts and are welded or otherwise rigidly secured to the member 15. The brace 16 is preferably so spaced from the pivoted end of the tongue as to rest upon the horizontal portion of the king pin when the tongue is swung forwardly, from the position shown in Figure 1, 180° in a vertical plane.

In the embodiment of the invention shown in Figures 1 to 3, the king pin is so mounted in the end piece 3 of the box that the threaded end thereof is positioned beneath the box. Curved channel irons 18 and 19 are rigidly secured to the king pin by means of a bolt 20 which extends through holes in the channel irons and through a hole in the king pin. The flanges of the channel irons engage the king pin and prevent relative rotation thereof about the bolt 20. The lower vertical portions of the channel irons are provided with apertures to receive the front axle (not shown) of the wagon, this axle supporting the wheels in any well known manner.

With this construction it will be seen that the tongue is positioned above the box and may be moved to various positions, it being possible to rotate the king pin 360°. Because of the offset horizontal portion 10 of the king pin, the pivot bolt 14 may be positioned as shown in these figures or forwardly of the wagon so that the effective length of the tongue, that is, the distance from the handle portion to the vertical part of the king pin, may be changed whether the handle is positioned forwardly of the wagon or is used for steering by an occupant of the box.

It will also be seen that the upper ends of the channel irons 18 and 19 constitute a bearing surface for cooperating with the plate 8 in taking the load on the front end of the wagon. These ends being small and close to the king pin, the wagon steers easily, the frictional forces between the channel irons and the plate 8 having small moment arms.

In the construction shown, the brackets for securing the rear axle to the wagon box are two in number, each consisting of a single piece of strap iron bent to provide ears 21 adapted to be bolted to the wagon box and having a central U-shaped portion 22 for receiving the rear axle. Bolts 23 are provided for rigidly clamping the rear axle in these U-shaped portions.

Figure 4 shows a construction in which the parts of the steering mechanism are the same as that of Figure 1 except that an additional nut 25 and washer 26 are provided, the nut 25 being threaded on the end of the portion 9 of the king pin. The main difference between this form and that of Figures 1 to 3 is in the manner of assembly. As shown, the horizontal portion 10 of the king pin is now positioned beneath the box. The channel irons are secured to the king pin as before except that the bolt 20 is placed in a different hole in the king pin than that shown in Figures 1 to 3. This assembly does not permit as much freedom in the steering when the wagon is used as a coaster as does the assembly shown in Figure 1, but is sometimes preferable when the wagon is used mostly for drawing loads. It is evident that the steering assembly may be readily changed from one form to the other to meet the requirements of any particular conditions.

Figure 5 shows a modification of the invention similar to that of Figures 1 to 3, except for the shape of the king pin 30, which is of the double angled shape shown. It is evident from the above description that this king pin may be assembled in a manner similar to that of Figures 1 to 3, or like the assembly of Figure 4, so as to support the tongue either above or below the level of the wagon box.

Figure 6 shows a further variation of the invention in which a washer 31 and coil spring 32 are positioned between the upper ends of the channel irons 18 and 19 and the bearing plate 8. This spring may be used with any of the forms of the invention and provides a practical and simple spring construction for the wagon.

Figures 7 and 8 show a further modification of the invention. The king pin of this construction is similar to that of Figures 1 to 3 except that the lower end is not threaded. This end is preferably, though not necessarily, flattened as shown at 35 to provide a portion adapted to be engaged by depending lugs 36. These lugs are welded to a single piece channel iron yoke 37 which carries the front axle of the wagon in the same way as the channel irons 18 and 19 described above. The lugs 36 are secured to the flattened end of the king pin by a bolt 38 and together with this bolt reinforces the central portion of the yoke which is apertured to accommodate the king pin.

This construction is also capable of being assembled with the horizontal portion of the king pin either above or below the wagon box, if the king pin is provided with an additional flat portion 35 near the bend therein and/or with an additional hole to receive the bolt 38. In the arrangement shown, however, the parts may be assembled in only the one way.

In view of the above description it will be seen that the present improvements provide a wagon which is unusually rigid and strong and is yet one in which the parts are few in number, are easy to manufacture and may be easily assembled in various ways to satisfy different requirements.

While only a few of the forms which the wagon box might take has been disclosed here, it is obvious that various changes may be made in the materials used and in the details of the construction without departing from the spirit of the invention or the scope of the annexed claims. The wagon box may be constructed of metal instead of wood, one construction contemplated having a one piece box made from a single piece of sheet iron. With such a box the front end piece 3 would not be used, but a metal journal box, made of cast or strap iron would be fastened to the front side portion of the box to support the king pin. A metal journal box would, of course, be suitable for use with a wooden box, also.

It is also evident that the portions 9 and 10 of the king pin need not be disposed at right angles to each other as shown in the figures. A convenient arrangement would be one in which these portions form an angle of approximately forty-five degrees so as to position the bolt 14 in front of the box.

The invention claimed is:

1. A coaster wagon having a box provided with a bearing at its forward end, a king pin having angularly disposed portions, a tongue pivotally connected to an end of one of said portions, the other of said portions being selectively positioned upright or inverted in said bearing whereby the tongue may be extended rearwardly over the box or extended forwardly from beneath the box, and a pair of channel irons having vertical portions snugly fitting and secured to a vertical portion of said king pin in either position and cooperable with the box of the wagon to limit the upward movement of the king pin relative thereto, said channel irons being adapted to constitute a front axle support.

2. A coaster wagon having a box provided with a bearing at its forward end, a king pin having angularly disposed portions, a tongue pivotally connected to an end of one of said portions, the other of said portions being selectively positioned upright or inverted in said bearing whereby the tongue may be extended rearwardly over the wagon or extended forwardly from beneath the box, and an axle supporting structure secured to a vertical portion of the king pin in either position thereof.

3. A coaster wagon comprising a wagon box having a vertical bearing at its forward end, a king pin having a vertical portion fitted in said bearing and having a horizontal portion, an axle support connected to the vertical portion of the king pin below the wagon box, a tongue connected to the end of the horizontal portion of the king pin and consisting of a U-shaped main menber and a cross brace between the legs of said U-shaped main member, the cross brace being adapted to rest on the horizontal portion of the king pin in one position of the tongue relative to the king pin.

In witness whereof, I hereto affix my signature.

THOMAS M. PUTNAM.